(12) United States Patent
Park et al.

(10) Patent No.: US 11,747,543 B1
(45) Date of Patent: Sep. 5, 2023

(54) LIGHTING SYSTEM LAMINATED INTO GLASSES USING MICROLEDS AND LENS

(71) Applicant: GM Global Technology Operations LLC, Detroit, MI (US)

(72) Inventors: Jonglee Park, Troy, MI (US); Michael K. Larsen, Warren, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 17/683,821

(22) Filed: Mar. 1, 2022

(51) Int. Cl.
| | |
|---|---|
| *B60Q 1/24* | (2006.01) |
| *F21V 8/00* | (2006.01) |
| *B60Q 1/26* | (2006.01) |
| *F21S 43/239* | (2018.01) |
| *B60Q 1/30* | (2006.01) |

(52) U.S. Cl.
CPC ............. *G02B 6/005* (2013.01); *B60Q 1/268* (2013.01); *F21S 43/239* (2018.01); *B60Q 1/30* (2013.01)

(58) Field of Classification Search
CPC ............................... B60Q 1/268; F21S 43/239
See application file for complete search history.

(56) References Cited

U.S. PATENT DOCUMENTS

| | | | |
|---|---|---|---|
| 6,550,949 B1* | 4/2003 | Bauer | B60Q 1/0023 362/800 |
| 2014/0003076 A1* | 1/2014 | Suganumata | F21S 43/245 362/511 |
| 2020/0384740 A1* | 12/2020 | Berard | F21S 43/15 |

* cited by examiner

*Primary Examiner* — Julie A Bannan
(74) *Attorney, Agent, or Firm* — Cantor Colburn LLP

(57) ABSTRACT

A vehicle includes a window having a lighting system therein. The lighting system includes a layer of an optical medium, a light source and a lens array. The layer of the optical medium has a first interface and a second interface. The light source emits a light ray that is incident at the first interface and travels through the optical medium to exit the optical medium at the second interface. The lens array is configured to reduce an occurrence of total internal reflection of the light ray at the second interface.

18 Claims, 10 Drawing Sheets

LIGHTING SYSTEM LAMINATED INTO GLASSES USING MICROLEDS AND LENS

INTRODUCTION

The subject disclosure relates to lighting systems in vehicles and, in particular, to lighting systems embedded within a window of the vehicle.

A vehicle can include an embedded lighting system that includes a light source that is embedded within a window or pane of the vehicle. The light source transmits a beam of light from a location within the pane to pass through a glass layer and out into the outside environment. The light therefore passes through a first interface to enter the pane and a second interface to exit the pane. A light ray that is incident at the first interface at a large angle of incident can be incident at the second interface at angle that is greater than a critical angle. Such light will experience total internal reflection at the second interface. This internally reflected light is lost to an observer in the outside environment and thereby reduces the brightness of the light source as viewed by the observer. Accordingly, it is desirable to provide a lighting system which can redirect the light to reduce total internal reflection.

SUMMARY

In one exemplary embodiment, a lighting system is disclosed. The lighting system includes a layer of an optical medium, the layer having a first interface and a second interface, a light source that emits a light ray that is incident at the first interface and travels through the optical medium to exit the optical medium at the second interface, and a lens array configured to reduce an occurrence of total internal reflection of the light ray at the second interface.

In addition to one or more of the features described herein, the lens array is in contact with one of the first interface and the second interface. The lens array is formed into a surface of one of the first interface and the second interface. A surface of a lens in the lens array forms one of a concave surface, a prismatic surface, and a triangular surface. The layer is part of a window of a vehicle and the light source is embedded with the window. The lighting system further includes a diffuser plate between the light source and the optical medium. The light source generates a light beam having a first light distribution profile, the light beam having a second light distribution profile after passing through lens and the layer of the optical medium, wherein the second light distribution profile has a reduced an angular range in comparison to the first light distribution profile.

In another exemplary embodiment, a window of a vehicle is disclosed. The window includes a layer of an optical medium, the layer having a first interface and a second interface, a light source that emits a light ray that is incident at the first interface and travels through the optical medium to exit the optical medium at the second interface, and a lens array configured to reduce an occurrence of total internal reflection of the light ray at the second interface.

In addition to one or more of the features described herein, the lens array is in contact with one of the first interface and the second interface. The light source is embedded in the window. The lens array is formed into a surface of one of the first interface and the second interface. A surface of a lens in the lens array forms one of a concave surface, a prismatic surface, and a triangular surface. The light source is embedded with the window. The light source generates a light beam having a first light distribution profile, the light beam having a second light distribution profile after passing through the lens and the layer of the optical medium, wherein the second light distribution profile has a reduced an angular range in comparison to the first light distribution profile.

In yet another exemplary embodiment, a vehicle is disclosed. The vehicle includes a window having a layer of an optical medium, the layer having a first interface and a second interface, a light source that emits a light ray that is incident at the first interface and travels through the optical medium to exit the optical medium at the second interface, and a lens array configured to reduce an occurrence of total internal reflection of the light ray at the second interface.

In addition to one or more of the features described herein, wherein the lens array is in contact with one of the first interface and the second interface. The lens array is formed into a surface of one of the first interface and the second interface. The lens array is located between micro-LEDs of the array of micro-LEDs. A surface of a lens of the lens array is one of a concave surface, a prismatic surface, and a triangular surface. The light source generates a light beam having a first light distribution profile, the light beam has a second light distribution profile after passing through the lens array and the layer of the optical medium, wherein the second light distribution profile has a reduced an angular range in comparison to the first light distribution profile.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
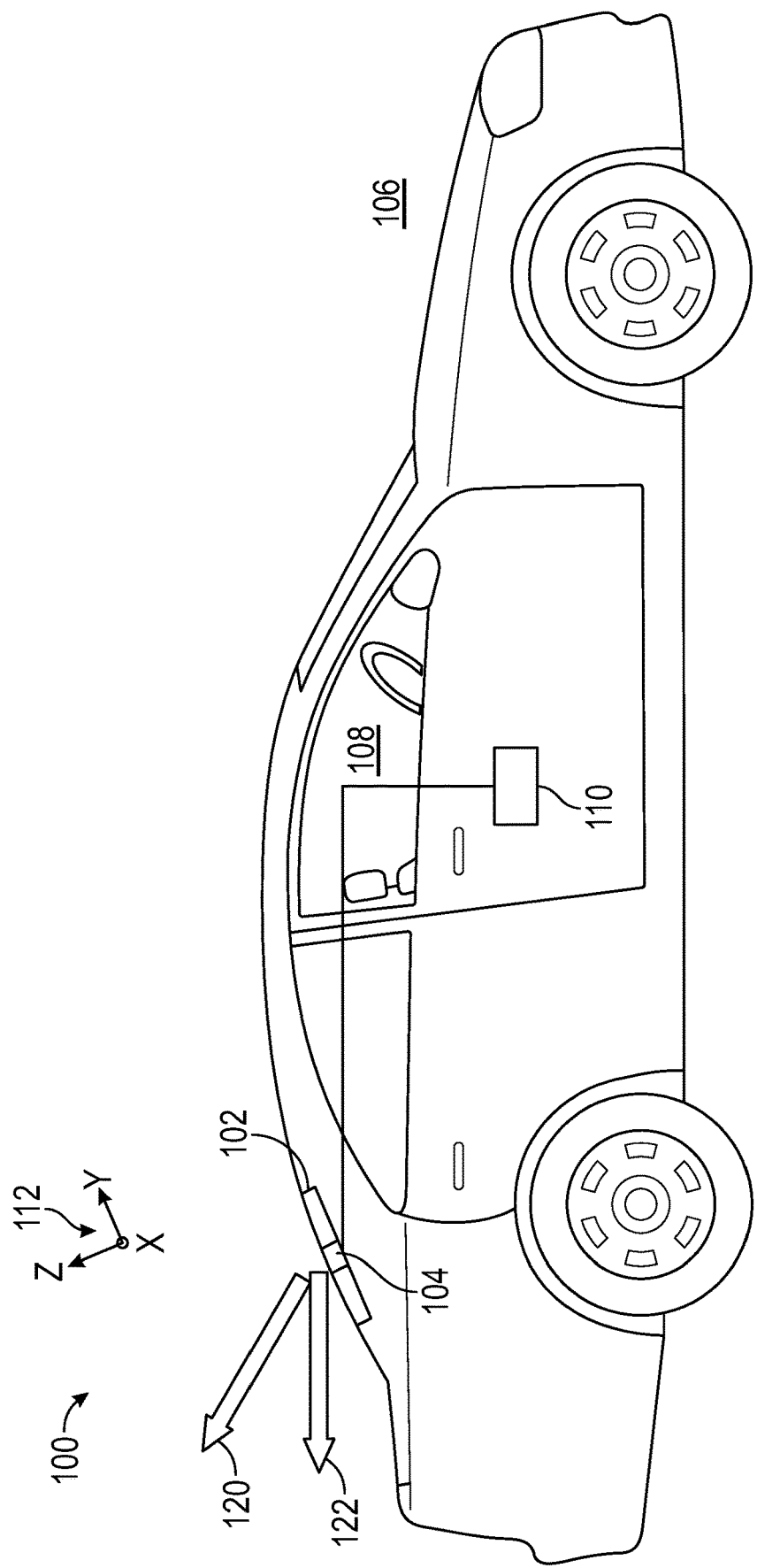
FIG. 1 shows a vehicle in an illustrative embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 100. The vehicle 100 includes a window 102 having a lighting system 104 embedded therein. The window 102 can be any window of the vehicle 100, including a windshield, a side window, rear window, etc. In addition, the window 102 can be a glass surface of an object, such as a mirror, etc. For illustrative purposes, the window 102 as discussed herein is a rear windshield that separates an outer region 106 of the vehicle 100 from an interior region 108. As disclosed herein, a lighting system 104 is embedded within the windshield. The lighting system 104 is coupled to a processor 110, which controls operation of the lighting system, for example, to illuminate a region or to display data. For ease of illustration, a coordinate system 112 is shown corresponding to a location of the lighting system 104 within the window 102. The z-axis of the coordinate system 112 is directed perpendicularly out of the window 102 and into the outer region 106. The x-axis and y-axis lie within, or substantially within, the plane of the window 102. The lighting system 104 includes deflecting optics, as discussed herein, for the redirecting of light. First arrow 120 shows a direction in which light from the lighting system 104 naturally propagates in the absence of any deflection. Second arrow 122 shows a direction in which light propagates upon being deflected via the optics of the lighting system 104.

Figure 2:
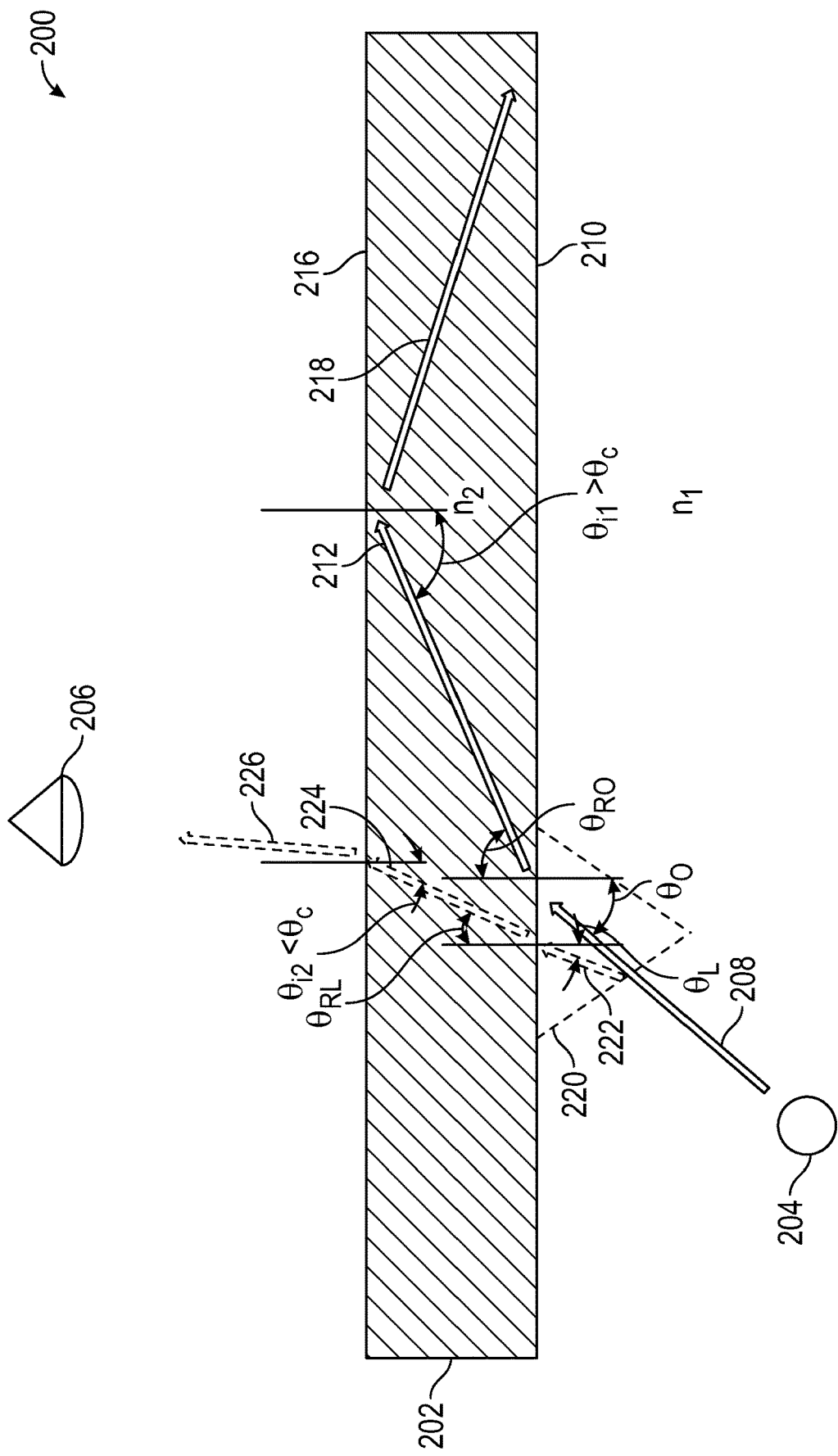
FIG. 2 shows a diagram illustrating the behavior of light passing through an optical medium.

FIG. 2 shows a diagram 200 illustrating the behavior of light passing through an optical medium 202. The diagram 200 shows a light source 204 located on one side of the optical medium 202 and an observer 206 located on a side of the optical medium 202 opposite the light source 204. In various embodiments, the optical medium 202 is glass and the light source 204 and the observer 206 are located in air. The light source 204 emits light at a plurality of angles. An initial light ray 208 is shown propagating from the light source 204 at an angle to a first interface 210 of the optical medium 202. The refraction of light passing from one medium to another is governed by Snell's Law, shown in Eq. (1):

$$n_i \sin \theta_i = n_r \sin \theta_r \qquad \text{Eq. (1)}$$

where $n_i$ is the index of refraction of the medium from which the light ray is incident at the interface, and $n_r$ is the index of refraction of the medium into which the light ray passes. The angles $\theta i$ and $\theta r$ are measured with respect to a normal line passing through the interface at a point at which the light ray is incident.

The initial light ray 208 is incident at the first interface 210 at an angle of incidence $\theta_O$. From Eq. (1), the initial light ray 208 experiences refraction at the first interface 210 which results in a first optical medium ray 212. The refraction causes the first optical medium ray 212 to bend away from the normal (i.e., $\theta_{RO} > \theta_O$). Since the second interface 216 is parallel to the first interface 210, the angle of incidence $\theta_{i1}$ for the first optical medium ray 212 at the second interface is the same as the angle of refraction $\theta_{RO}$ at the first interface (i.e., $\theta_{i1} = \theta_{RO}$). Therefore, the first optical medium ray 212 is incident at the second interface 216 at a large angle $\theta_{i1}$. When this angle of incidence is greater than an angle known as the critical angle (i.e., when ($\theta_{i1} > \theta c$), a phenomenon known as total internal reflection occurs in which the first optical medium ray 212 is reflected back into the optical medium, as shown by internally reflected ray 218.

In the present invention, a lens surface 220 is placed at the first interface 210. The initial light ray 208 is incident at the lens surface 220 and is refracted to form a lens-refracted ray 222. As a result of the refraction at the lens surface 220, the lens-refracted ray 222 is incident at the first interface 210 at an angle of incidence $\theta_L$ that is smaller than for the angle of incidence $\theta_O$ of the initial light ray 208. The lens-refracted ray 222 produces a second optical medium ray 224 in the optical medium 202. The angle of refraction $\theta_{RL}$ for the second optical medium ray 224 is less than the angle of refraction $\theta_{OL}$ for the first optical medium ray 212. The second optical medium ray 224 is therefore incident at the second interface 216 at an angle $\theta i_2$ that is less than the critical angle $\theta c$, thereby allowing an exiting light ray 226 to pass out of the optical medium 202 and be viewed by the observer 206.

Figure 3:
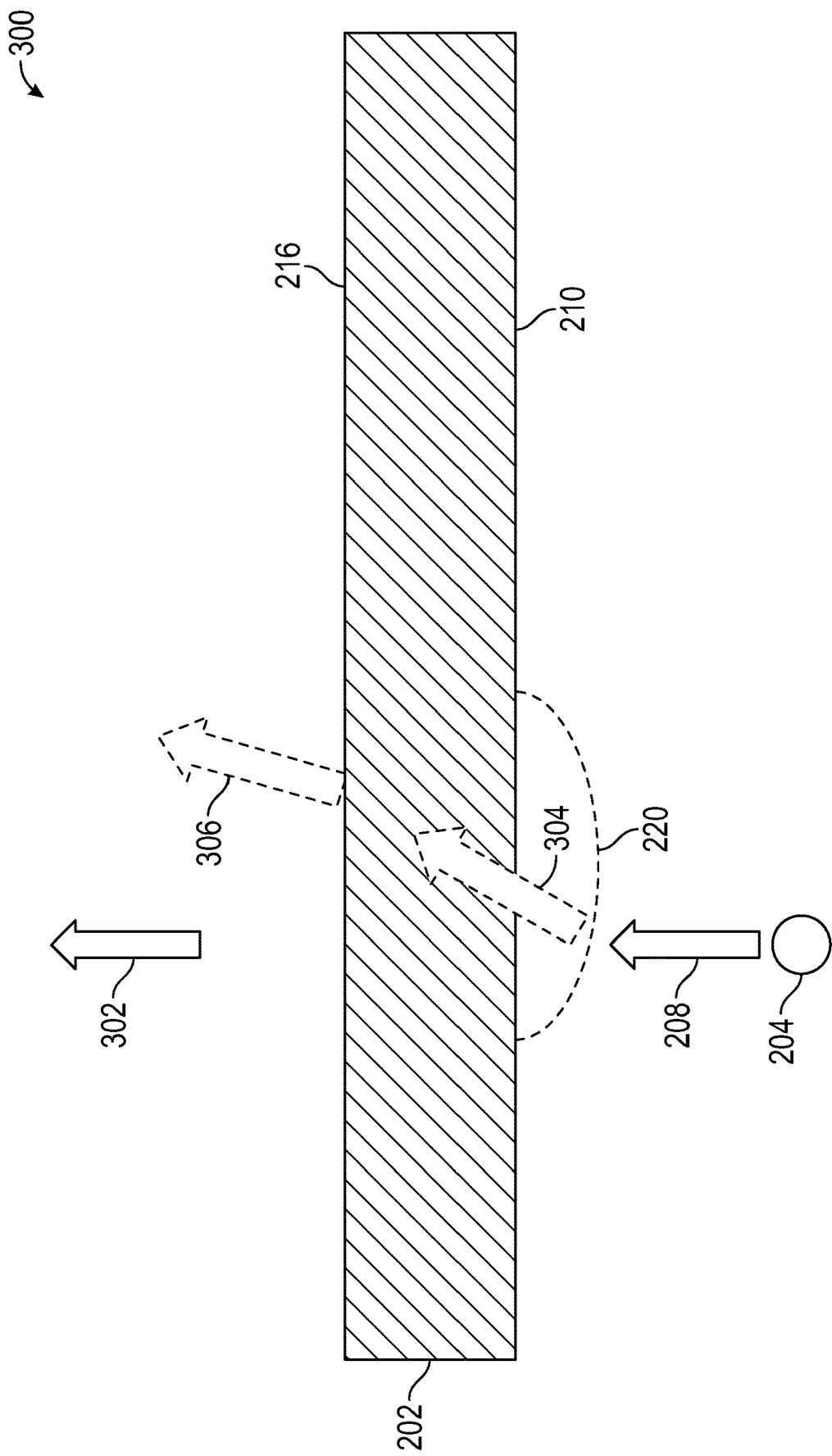
FIG. 3 shows a deflection of light that occurs using a lens surface at an interface of the optical medium.

FIG. 3 is a diagram 300 that shows a deflection of light that occurs using a lens surface 220 at the first interface 210 of the optical medium 202. An initial light ray 208 is shown propagated from the light source 204 in a direction that is perpendicular to the first interface 210. Left undeflected (i.e., without passing through the lens surface 220), the initial light ray 208 passes through the optical medium 202 without deflection and exits the optical medium along a same path, as shown by undeflected ray 302. However, when the initial light ray 208 passes through the lens surface 220, the lens deflects the light to form an optical medium ray 304 that passes through the optical medium to be incident on the second interface 216 at a non-zero angle. As a result, the exiting light ray 306 is an at angle to the initial propagation direction. Referring to both FIG. 3 and FIG. 1, the presence of the lens surface 220 changes a light beam from propagating along the first direction indicated by first arrow 120 to along a second direction as indicated by second arrow 122.

Figure 4:
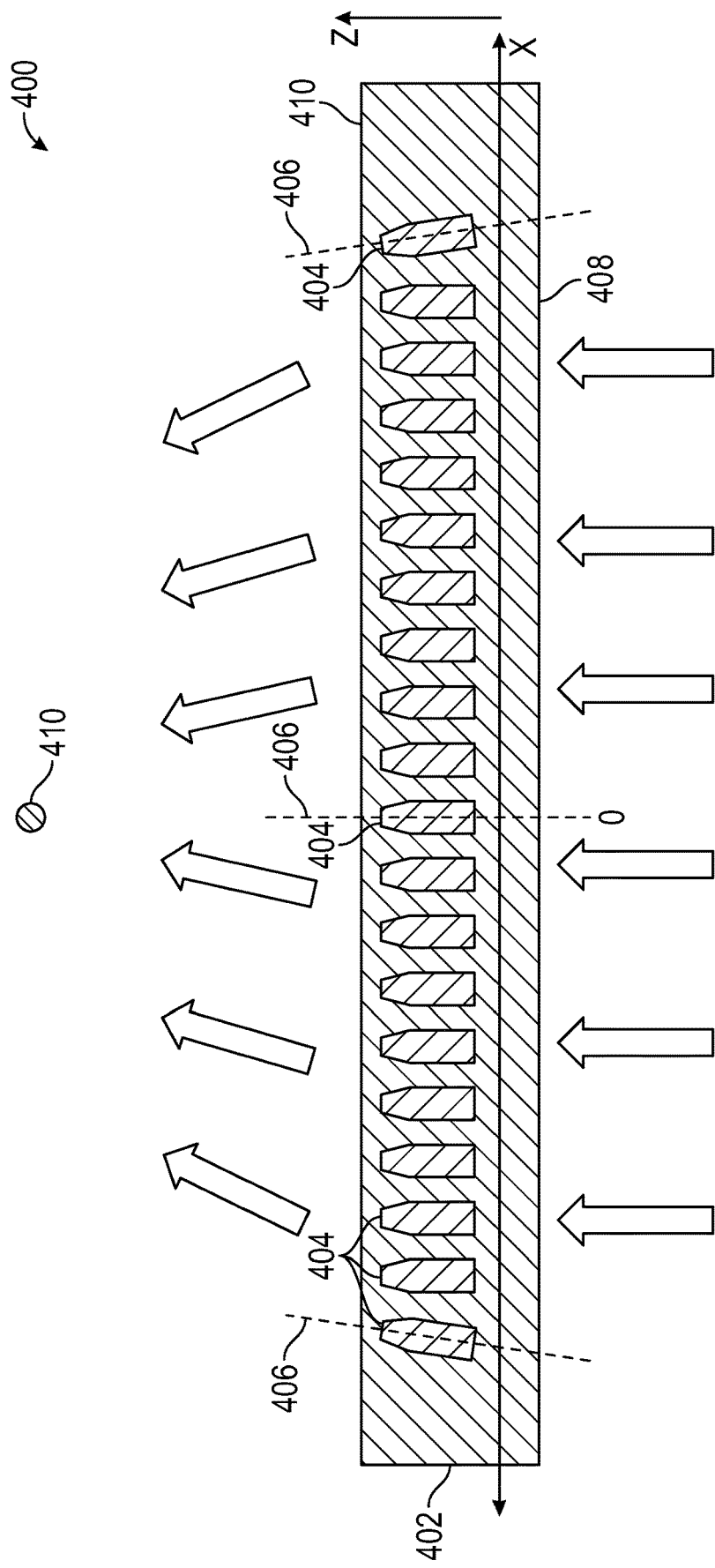
FIG. 4 shows a meta lens that can be used for focusing a light beam.

FIG. 4 shows a meta lens 400 that can be used for focusing a light beam. The meta lens 400 includes an optical medium 402 and nanoparticles 404 located inside the optical medium. Each of the nanoparticles 404 defines an axis of light transmission 406. As shown in FIG. 4, the nanoparticles 404 are spaced apart from each other along an x-axis which has its origin O at a center of the optical medium 402. The nanoparticle 404 that is located at the origin O has its axis of light transmission 406 aligned with the z-axis. The angle between an axis of light transmission for a nanoparticle 404 and the z-axis increases as the distance between the nanoparticle 404 and the origin increases. In various embodiments, this angle is linearly related to the distance of the nanoparticle 404 from the origin O. Light that is incident at a first interface 408 perpendicular to the first interface is therefore redirected by each nanoparticle 404 based on its distance from the origin O, resulting in a focusing of the light leaving the optical medium onto a selected focal point 410. Although the meta lens 400 is shown as a two-dimensional object in FIG. 4 for illustrative purposes, the meta lens 400 is generally a three-dimensional object. In such a three-dimensional meta lens 400, the axis of light transmission of a nanoparticle 404 can be angled based on a radial distance of the nanoparticle 404 from the origin O and can lie within a plane perpendicular to the second interface 410 that includes the origin O and the nanoparticle 404.

Figure 5:
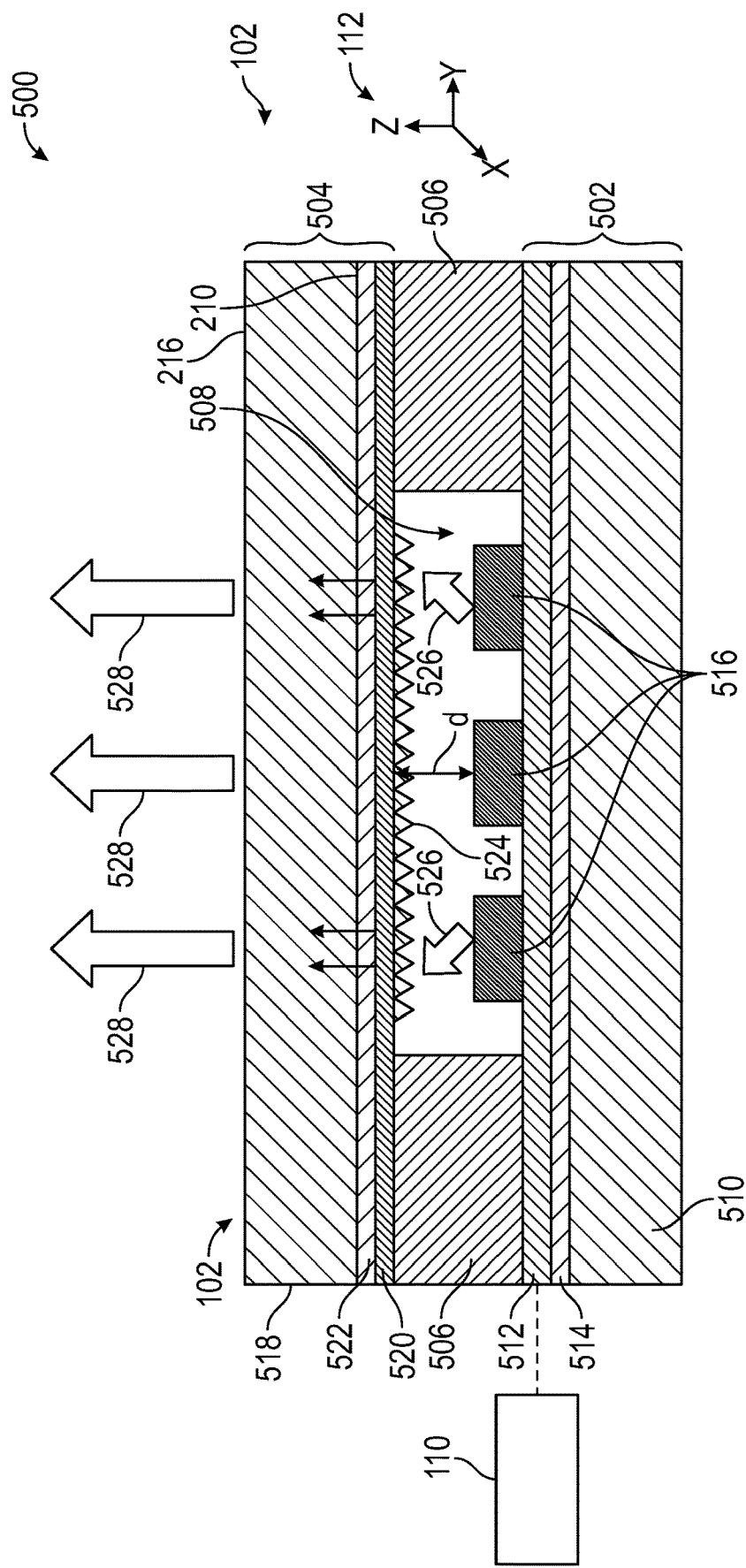
FIG. 5 shows a side sectional view of a window of the vehicle of FIG. 1, in an embodiment.

FIG. 5 shows a side sectional view 500 of a window 102 of the vehicle 100, in an embodiment. The coordinate system 112 is provided for ease of illustration. The window 102 includes an inner pane (first pane 502) and an outer pane (second pane 504) separated from each other by an intermediate optical bonding layer 506 that bonds the first pane to the second pane. The first pane 502 and the second pane 504 are parallel to an xy-plane. A normal line to either the first pane 502 or the second pane 504 is therefore aligned with the z-axis. Along with the first pane 502 and the second pane 504, the intermediate optical bonding layer 506 forms a hollow chamber 508 within which various optical elements are disposed.

The first pane 502 includes a first glass layer 510, a backplane film 512 and a back bonding layer 514 that bonds the backplane film to the first glass layer. The back bonding layer 514 and the backplane film 512 are transparent or semi-transparent in the optical region of the electromagnetic spectrum. One or more LEDs or micro-LEDs 516 are disposed within the hollow chamber 508 and are attached to the backplane film 512. The micro-LEDs 516 can be arranged to form a two-dimensional array within the x-y plane. The backplane film 512 includes conductive wires through which electrical signals can be passed from the processor 110 to the micro-LEDs 516 to control their illumination, such as by turning them on and off. The backplane film 512 can be a transparent substrate or a black printed substrate, in various embodiments. The first glass layer 510 can be made of a polycarbonate material, in various embodiments.

The second pane 504 includes a second glass layer 518, a micro-lens film 520, and a top bonding layer 522 that bonds the micro-lens film to the second glass layer 518, thereby suspending the micro-lens film 520 above the micro-LEDs 516 by a separation distance d. The second glass layer 518 includes a first interface 210 facing the hollow chamber 508 and a second interface 216 facing the outside environment. The micro-lens film 520 is placed against the first interface 210 of the second glass layer 518. The micro-lens film 520 includes a plurality of refractive surfaces 524 that are used to reduce total internal reflection effects at the second interface 216 of the second glass layer 518. A refractive surface 524 can be a lens or micro-lens. In one embodiment, a micro-lens includes a concave surface exposed to the hollow chamber 508. In other embodiments, a micro-lens includes a triangular surface or a prismatic surface exposed to the hollow chamber. In another embodiment, the micro-lens film 520 can be replaced by the meta lens 400 of FIG. 4. The second glass layer 518 can be made of a polycarbonate material, in various embodiments.

The micro-lens film 520 is disposed in the hollow chamber and is located between the array of micro-LEDs 516 and the second glass layer 518. Since the micro-lens film 520 extends across the face of the array of micro-LEDs 516, at least one micro-lens receives light at a high angle of incidence. Light 526 that is incident at a micro-lens at a high angle of incidence is refracted by the micro-lens to reduce the angle at which light is incident at the second glass layer 518, thereby reducing the occurrence of total internal reflection, as discussed with respect to FIG. 2. In various embodiments, the micro-lens that receives light at a high angle of incidence is off of a central axis of a micro-LED and can be located between two micro-LEDs, as viewed within the xy-plane.

Figure 6:
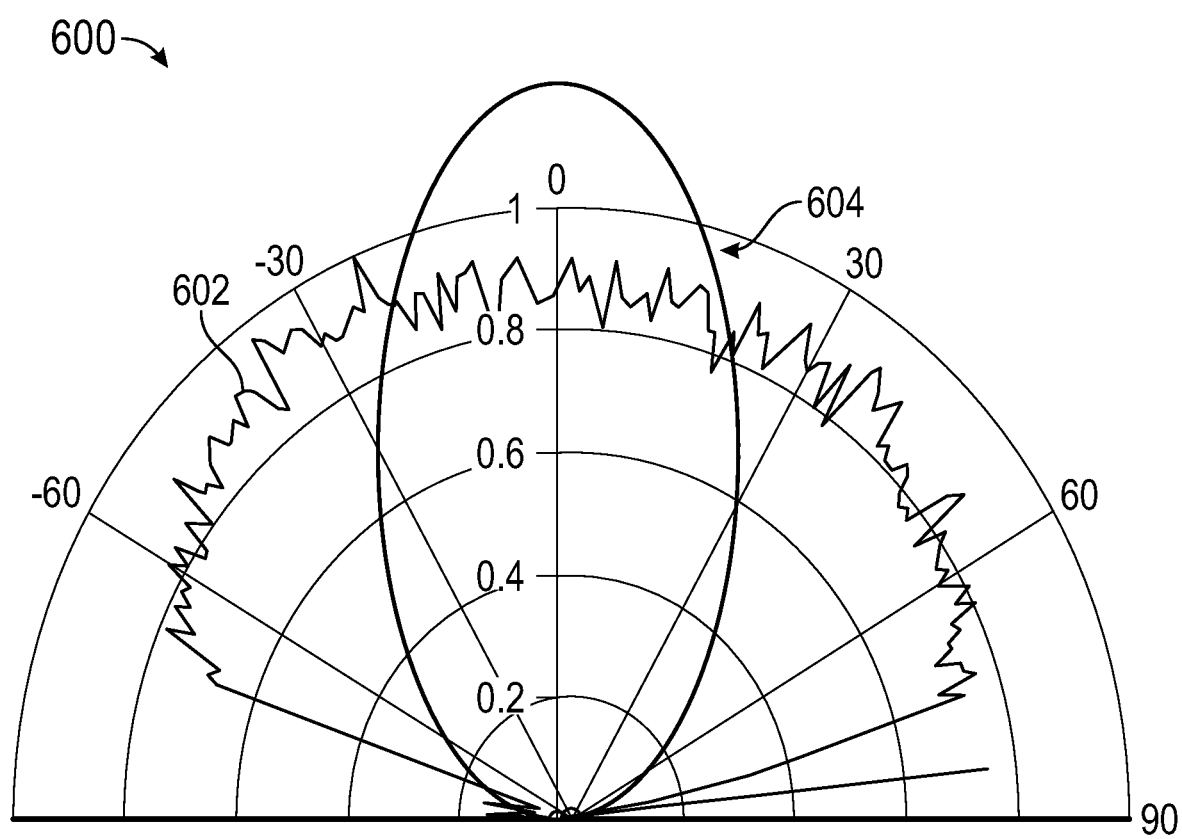
FIG. 6 shows a light distribution chart illustrating various light distribution profiles for the lighting system.

FIG. 6 shows a light distribution chart 600 illustrating various light distribution profiles for the lighting system. A first light distribution profile 602 shows a first angular light distribution for the array of micro-LEDs 516 before its light beam passes through the micro-lens film 520 and second glass layer 518. The first angular light distribution has relatively equal brightness over an angular range of about seventy degrees from the normal direction (0°). The second light distribution profile 604 shows a second angular light distribution after the light beam has passed through the micro-lens film 320 and the second glass layer 318. The light beam is more focused, having a high brightness over a range of about 35 degrees from the normal direction. In addition, the brightness in the normal direction is greater for the second light distribution profile 604 than for the first light distribution profile 602. It is to be understood that the second light distribution profile 604 is an illustrative distribution profile that is generated by the particular triangular-shaped surface of the micro-lens film 520 shown in FIG. 5, A different light distribution profile will result from using of micro-lenses having differently shaped surfaces. In addition, a designer can select a particular shape or type of surface for the micro-lens film 520 in order to achieve a selected light distribution profile.

Figure 7:
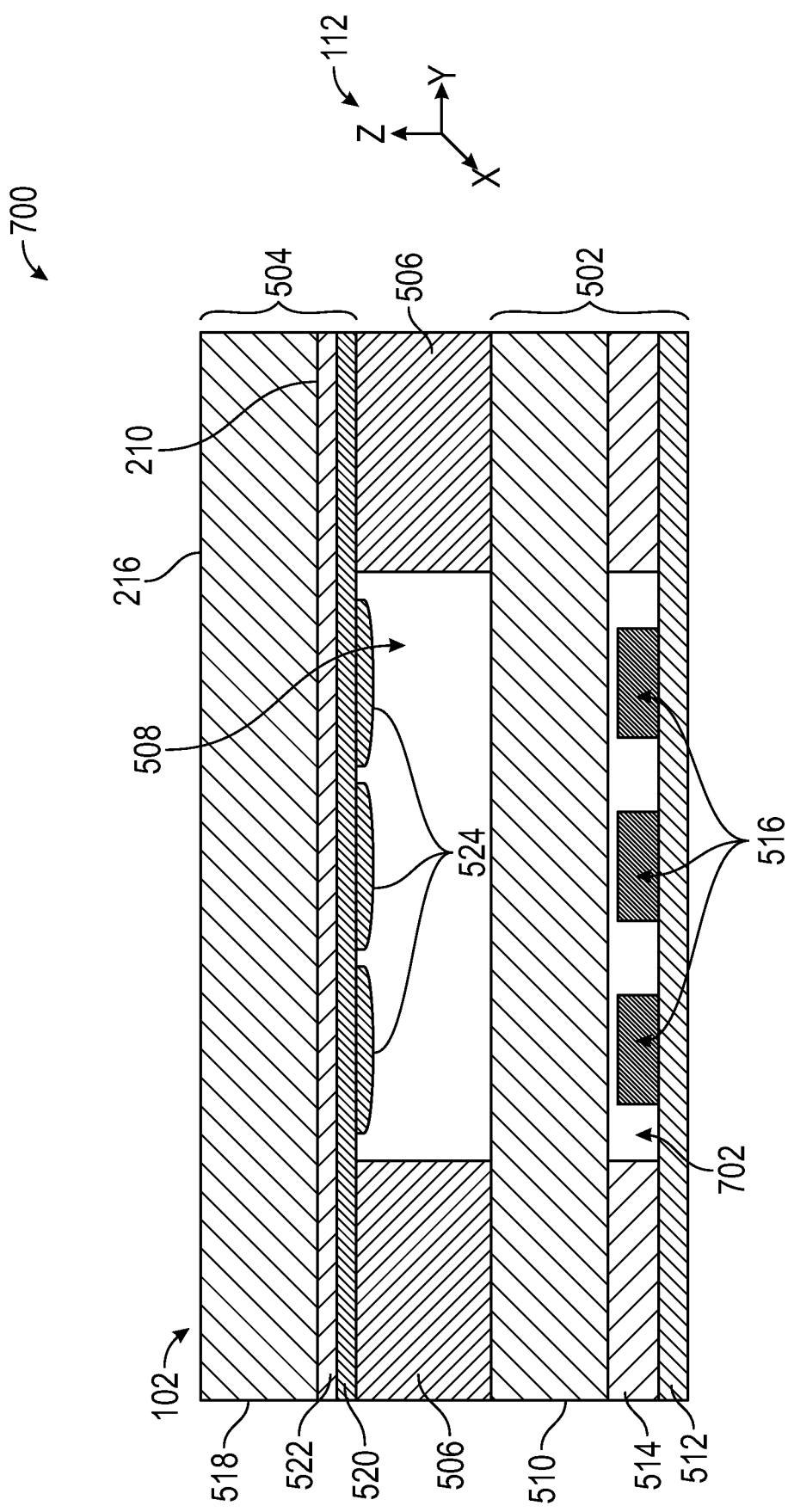
FIG. 7 shows a side sectional view of the window of the vehicle, in another embodiment.

FIG. 7 shows a side sectional view 700 of the window 102 of the vehicle 100, in another embodiment. The window 102 includes the first pane 502, the second pane 504, and the intermediate optical bonding layer 506 forming a hollow chamber 508 between the first pane 502 and second pane 504. The first pane 502 includes the backplane film 512, a back bonding layer 514, and the first glass layer 510. The back bonding layer 514 bonds the backplane film 512 to the first glass layer 510 to form a light chamber 702 within which the one or more micro-LEDs 516 are disposed. The second pane 504 includes the second glass layer 518, a micro-lens film 520, and top bonding layer 522 that bonds the micro-lens film to the second glass layer 518. The micro-lens film 520 can include lenses having refractive surfaces 524 or can be the meta lens 400 of FIG. 4, in various embodiments. The light from the micro-LEDs 516 pass through the first glass layer 510 in order to enter the hollow chamber 508. The first glass layer 510 can act as a diffuser plate to diffuse light from the array of micro-LEDs 516. The diffusion improves the homogeneity of light, but also increases the angle of incidence at the micro-lens film 520. The micro-lens film 520 then deflects the light rays along a direction as indicated by their lens surfaces.

Figure 8:
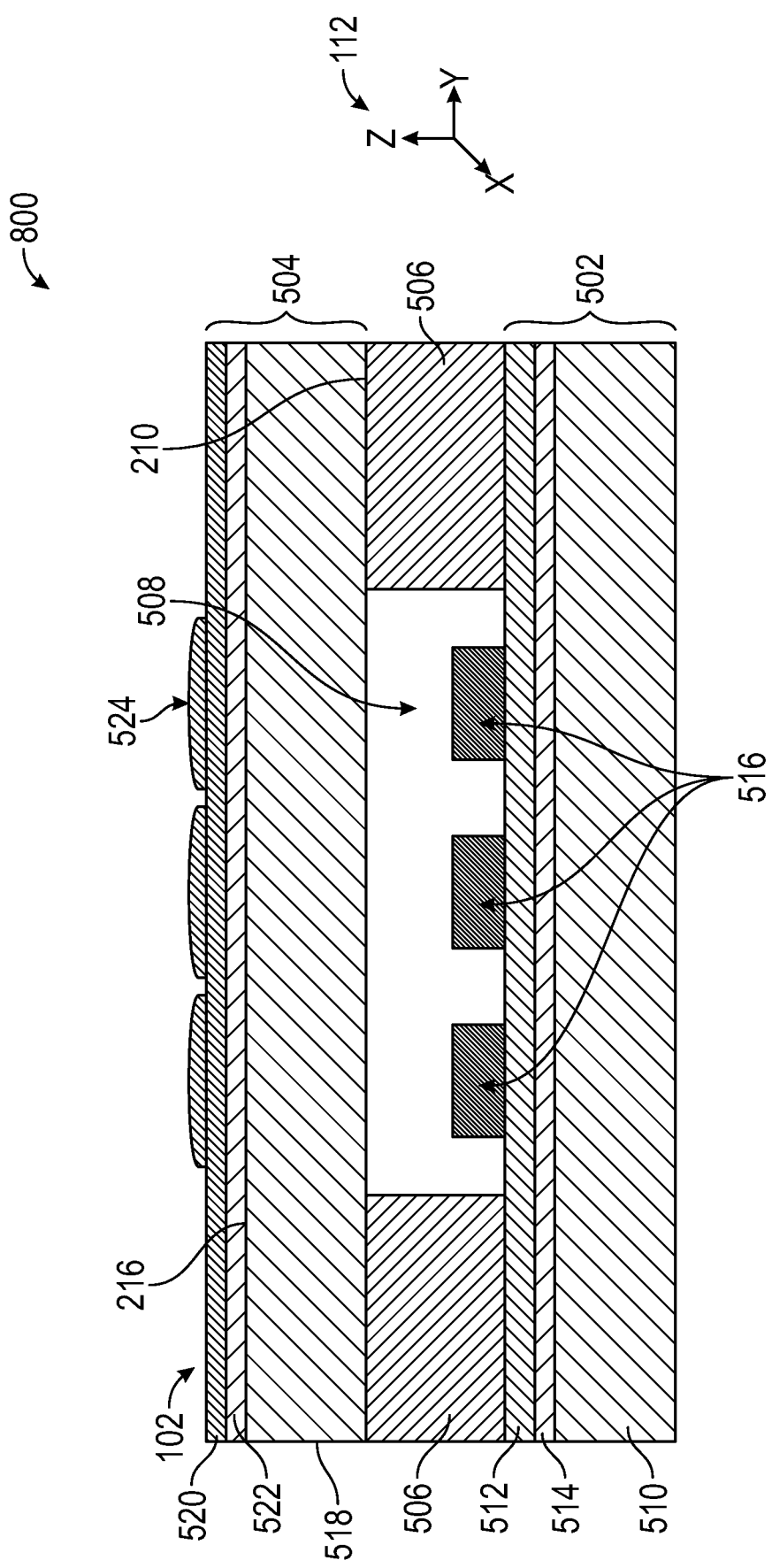
FIG. 8 shows a side sectional view of the window of the vehicle, in another embodiment.

FIG. 8 shows a side sectional view 800 of the window 102 of the vehicle 100, in another embodiment. The window 102 includes the first pane 502, the second pane 504, and the intermediate optical bonding layer 506 forming a hollow chamber 508 between the first pane 502 and the second pane 504. The micro-LEDs 516 are disposed in the hollow chamber 508.

The first pane 502 includes the first glass layer 510, backplane film 512 and back bonding layer 514 for bonding the backplane film to the first glass layer. The second pane 504 includes the second glass layer 518, micro-lens film 520, and top bonding layer 522 that bonds the micro-lens film to the second glass layer 518. The micro-lens film 520 is located on the outer surface (i.e., the second interface 216) of the second glass layer 518. The presence of the micro-lens film 520 at the second interface 216 changes a critical angle of the second interface (with respect to a glass-air interface) and therefore reduces an occurrence of total internal reflection at the second interface. In addition, the uniformly parallel light is uniformly deflected at the second pane 504. The micro-lens film 520 can include lenses having refractive surfaces 524 or can be the meta lens 400 of FIG. 4, in various embodiments.

Figure 9:
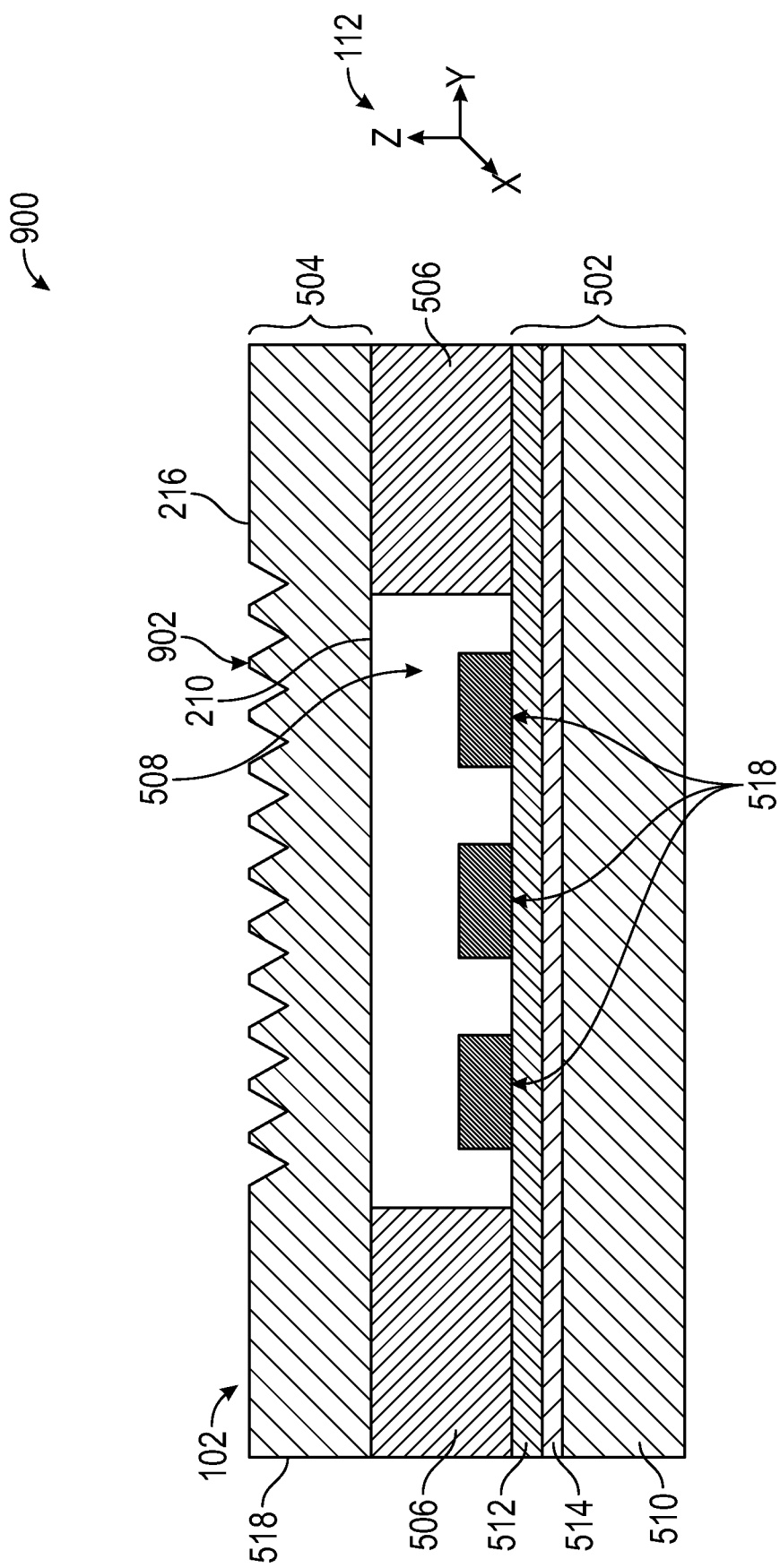
FIG. 9 shows a side sectional view of the window of the vehicle in another embodiment.

FIG. 9 shows a side sectional view 900 of the window 102 of the vehicle 100, in another embodiment. The second pane 504 includes only the second glass layer 518. The second glass layer 518 has a first interface 210 facing the hollow chamber 508 and a second interface 216 facing the outside environment. The first interface 210 is a planar interface. The second interface 216 is a non-planar interface which is formed or etched into the shape of a plurality of lens surfaces 902. In various embodiments, the lens surfaces 902 can be triangular, concave, etc.

Figure 10:
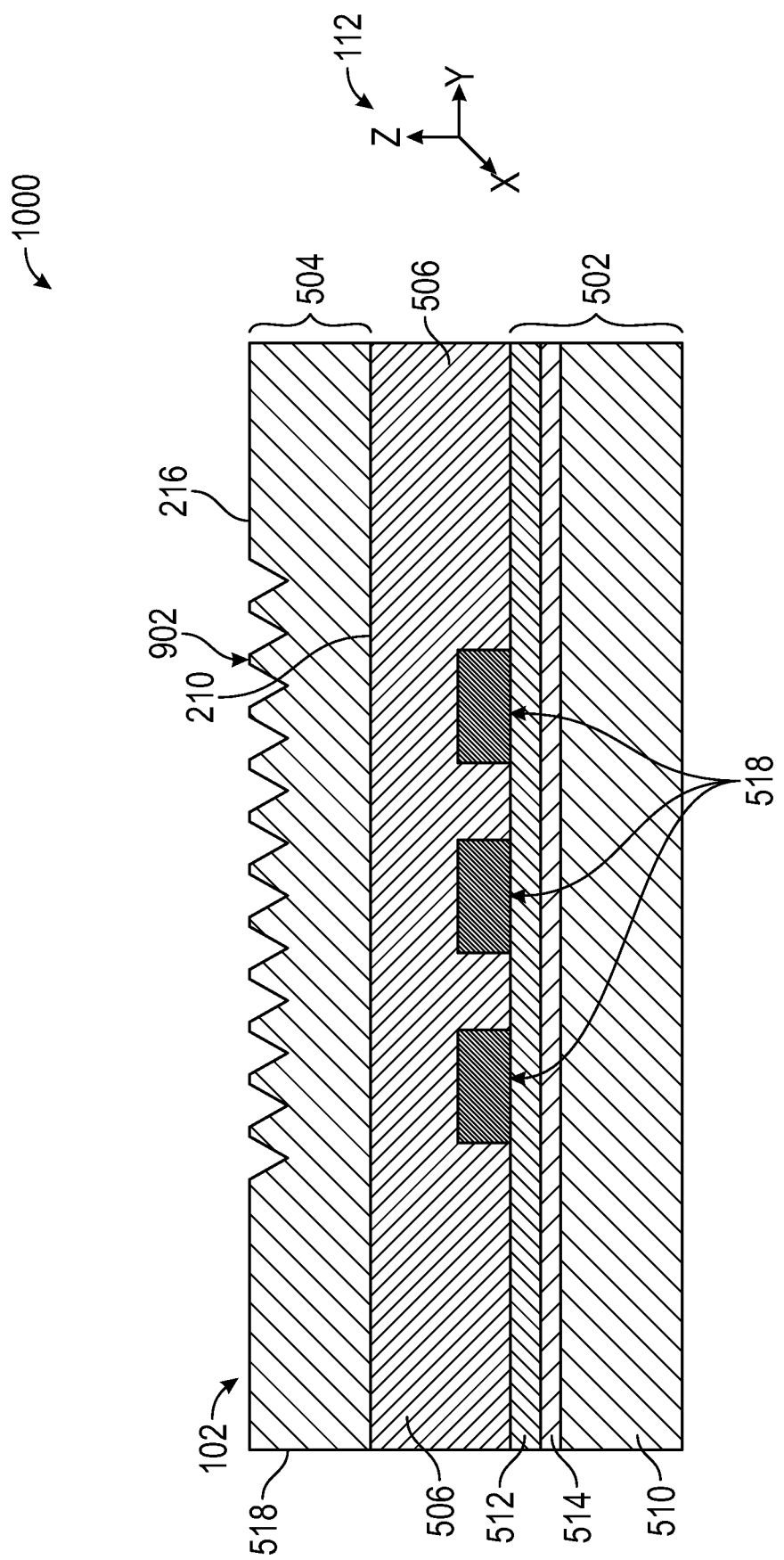
FIG. 10 shows a side section view of the window in another embodiment.

FIG. 10 shows a side section view 1000 of the window 102 in another embodiment. In contrast to FIG. 9, the intermediate optical bonding layer 506 fills in the space between the first pane 502 and the second pane 504 so that there is no hollow chamber. Thus, the second glass layer 518 has a first interface 210 in contact with the intermediate optical bonding layer 506 and a second interface 216 facing the outside environment. The first interface 210 is a planar interface. The second interface 216 is a non-planar interface which is formed or etched into the shape of a plurality of lens surfaces 902. In various embodiments, the lens surfaces 902 can be triangular, concave, etc.

Similar to FIG. 10, FIG. 8 can be constructed so that the intermediate optical bonding layer 506 fills in the space between the first pane 502 and the second pane 504 so that there is no hollow chamber.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A lighting system for a vehicle, comprising:
a first pane of a window;
a second pane of the window;
an optical bonding layer that bonds the first pane to the second pane to form a hollow chamber between the first pane and the second pane;
a layer of an optical medium within the first pane, the layer having a first interface and a second interface;
a light source within the hollow chamber and attached to a back plane film of the first pane, wherein the light source emits a light ray directed toward the first interface; and
a lens array between the layer and the light source, the lens array bonded to the layer and having a plurality of refractive surfaces facing the light source, wherein the plurality of refractive surfaces redirects the light ray incident at the lens array to reduce an occurrence of total internal reflection of the light ray at the second interface.

2. The lighting system of claim 1, wherein the lens array is formed into a surface of one of the first interface and the second interface.

3. The lighting system of claim 2, wherein a surface of a lens in the lens array forms one of: (i) a concave surface; (ii) a prismatic surface; and (iii) a triangular surface.

4. The lighting system of claim 1, further comprising a diffuser plate between the light source and the optical medium.

5. The lighting system of claim 1, wherein the light source generates a light beam having a first light distribution profile and wherein the light beam has a second light distribution profile after passing through the lens array and the layer of the optical medium, wherein the second light distribution profile has a reduced an angular range in comparison to the first light distribution profile.

6. A window of a vehicle, comprising:
a first pane of the window;
a second pane of the window;
an optical bonding layer that bonds the first pane to the second pane to form a hollow chamber between the first pane and the second pane;
a layer of an optical medium within the second pane, the layer having a first interface and a second interface;
a light source within the hollow chamber and attached to a back plane film of the first pane, wherein the light source emits a light ray directed toward the first interface; and
a lens array between the layer and the light source, the lens array bonded to the layer and having a plurality of refractive surface exposed to the hollow chamber, wherein the plurality of refractive surfaces redirects the light ray incident at the lens array to reduce an occurrence of total internal reflection of the light ray at the second interface.

7. The window of claim 6, wherein the lens array is formed into a surface of one of the first interface and the second interface.

8. The window of claim 7, wherein a surface of a lens in the lens array forms one of: (i) a concave surface; (ii) a prismatic surface; and (iii) a triangular surface.

9. The window of claim 8, wherein the light source is embedded with the window.

10. The window of claim 6, wherein the light source generates a light beam having a first light distribution profile and wherein the light beam has a second light distribution profile after passing through the lens array and the layer of the optical medium, wherein the second light distribution profile has a reduced an angular range in comparison to the first light distribution profile.

11. A vehicle, comprising:
a window having:
a first pane;
a second pane;
an optical bonding layer that bonds the first pane to the second pane to form a hollow chamber between the first pane and the second pane;
a layer of an optical medium within the second pane, the layer having a first interface and a second interface;
a light source within the hollow chamber and attached to a back plane film of the first pane, wherein the light source emits a light ray directed toward the first interface; and
a lens array between the layer and the light source, the lens array bonded to the layer and having a plurality of refractive surface exposed to the hollow chamber, wherein the plurality of refractive surfaces redirects the light ray incident at the lens array to reduce an occurrence of total internal reflection of the light ray at the second interface.

12. The window of claim 11, wherein the lens array is formed into a surface of one of the first interface and the second interface.

13. The window of claim 12, wherein the lens array is located between micro-LEDs of the array of micro-LEDs.

14. The window of claim 12, wherein a surface of a lens of the lens array is one of: (i) a concave surface; (ii) a prismatic surface; and (iii) a triangular surface.

15. The window of claim 11, wherein the light source generates a light beam having a first light distribution profile and wherein the light beam has a second light distribution profile after passing through the lens array and the layer of the optical medium, wherein the second light distribution profile has a reduced an angular range in comparison to the first light distribution profile.

16. The lighting system of claim 1, wherein the light ray in the optical medium is incident on the second interface at a non-zero angle.

17. The lighting system of claim 1, wherein the back plane film is one of: (i) transparent; and (ii) semi-transparent, in an optical region of the electromagnetic spectrum.

18. The lighting system of claim 1, wherein the back plane film including conductive wire thorough which electrical signal can be passed to control the light source.

\* \* \* \* \*